US012455518B2

(12) United States Patent
Miyagawa

(10) Patent No.: US 12,455,518 B2
(45) Date of Patent: Oct. 28, 2025

(54) REUSABLE TONER CONTAINER

(71) Applicant: KYOCERA Document Solutions Inc., Osaka (JP)

(72) Inventor: Tomoo Miyagawa, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/883,377

(22) Filed: Sep. 12, 2024

(65) Prior Publication Data

US 2025/0093797 A1 Mar. 20, 2025

(30) Foreign Application Priority Data

Sep. 19, 2023 (JP) ................................ 2023-150925

(51) Int. Cl.
*G03G 15/08* (2006.01)

(52) U.S. Cl.
CPC ..... *G03G 15/0886* (2013.01); *G03G 15/0865* (2013.01); *G03G 15/0894* (2013.01); *G03G 2215/00987* (2013.01)

(58) Field of Classification Search
CPC ............... G03G 15/08; G03G 15/0865; G03G 15/0886; G03G 15/0894
USPC ................................ 399/252, 258, 260, 262
See application file for complete search history.

(56) References Cited

U.S. PATENT DOCUMENTS 6,456,811 B1 * 9/2002 Kato .................. G03G 15/0886 222/DIG. 1
6,609,820 B2 * 8/2003 Litwiller ............... B01F 33/254 222/DIG. 1
8,953,977 B2 * 2/2015 Itabashi ............ G03G 15/0886 399/109
2006/0171737 A1 8/2006 Nishimura et al.
2010/0092207 A1 4/2010 Ito et al.

FOREIGN PATENT DOCUMENTS

JP 2006208837 A 8/2006
JP 2010096828 A 4/2010

* cited by examiner

*Primary Examiner* — Hoan H Tran
(74) *Attorney, Agent, or Firm* — IP Business Solutions, LLC.

(57) ABSTRACT

A toner container includes a tank and a cap. The tank includes a cylindrical loading port, through which toner is to be loaded. The cap is formed of a flexible material, and configured to close the loading port. The cap includes a fitting portion, a bottom portion, and a flange portion. The fitting portion is formed in a cylindrical shape that fits an inner surface of the loading port. The bottom portion is located on a far side of the fitting portion, in a cap insertion direction. The flange portion is located on a near side of the fitting portion in the cap insertion direction, to be made to contact an edge of the loading port. The fitting portion includes a cut-away portion formed in an annular shape along a circumferential direction of the fitting portion.

7 Claims, 10 Drawing Sheets

REUSABLE TONER CONTAINER

INCORPORATION BY REFERENCE

This application claims priority to Japanese Patent Application No. 2023-150925 filed on Sep. 19, 2023, the entire contents of which are incorporated by reference herein.

BACKGROUND

The present disclosure relates to a toner container.

In recent years, there has been an increasing demand for recycling of used toner containers of electrophotographic image forming apparatuses, from the viewpoint of energy saving and environmental protection. In accordance therewith, some techniques to replenish the used toner container with toner have been developed.

SUMMARY

The disclosure proposes further improvement of the foregoing techniques.

In an aspect, the disclosure provides a toner container including a tank and a cap. The tank includes a cylindrical loading port, through which toner is to be loaded. The cap is formed of a flexible material, and configured to close the loading port. The cap includes a fitting portion, a bottom portion, and a flange portion. The fitting portion is formed in a cylindrical shape that fits an inner surface of the loading port. The bottom portion is located on a far side of the fitting portion, in a cap insertion direction. The flange portion is located on a near side of the fitting portion in the cap insertion direction, to be made to contact an edge of the loading port. The fitting portion includes a cut-away portion formed in an annular shape along a circumferential direction of the fitting portion.

DETAILED DESCRIPTION

Hereafter, a toner container according to an embodiment of the disclosure will be described, with reference to the drawings.

Figure 1:
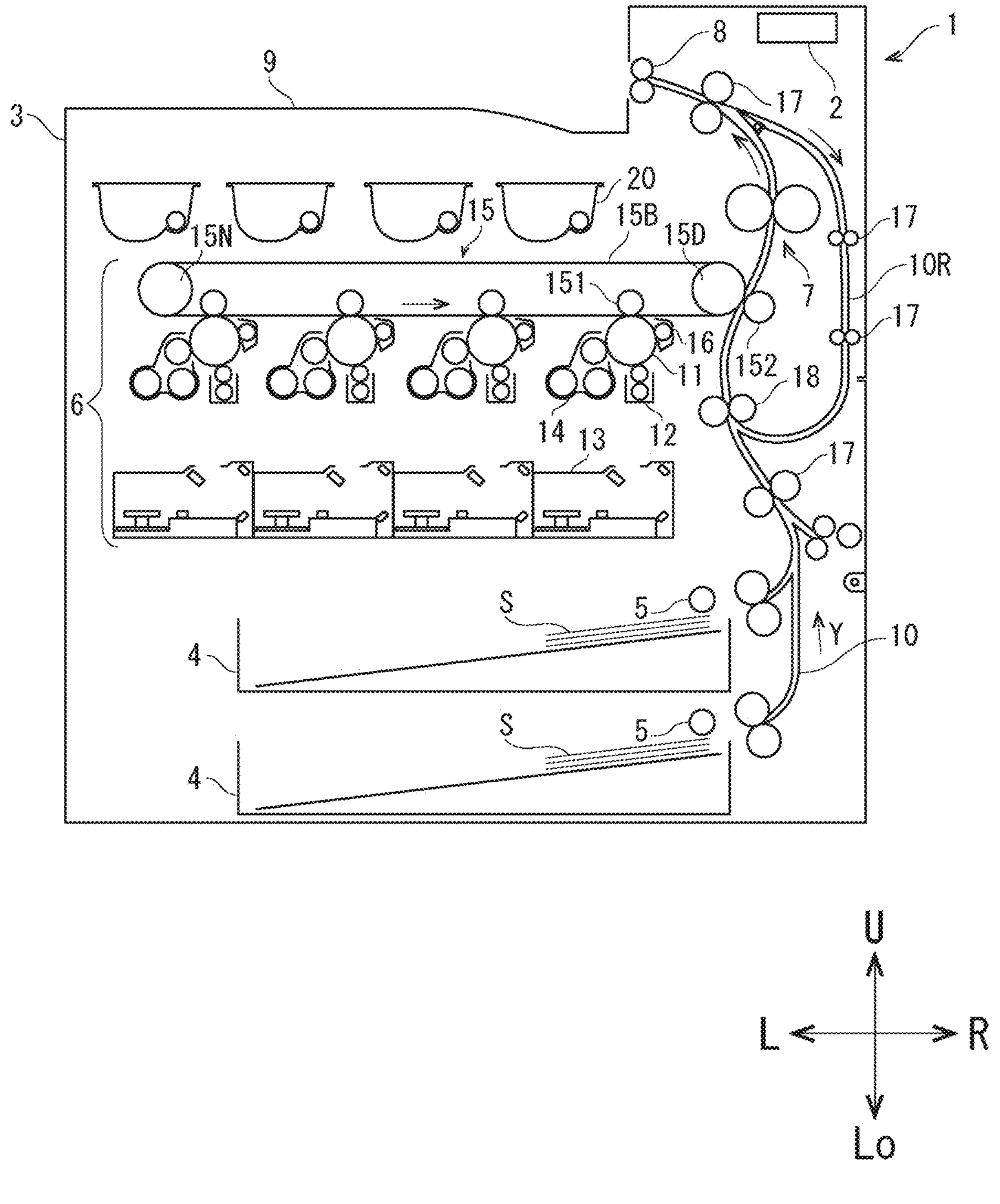
FIG. 1 is a schematic front view showing an internal configuration of a printer according to an embodiment of the disclosure.

First, the general configuration of a printer 1 (an example of the image forming apparatus) will be described. FIG. 1 is a schematic front view showing an internal configuration of the printer 1. Hereinafter, the near side of the sheet of FIG. 1 will be defined as front (forward) side of the printer 1, and the left and right sides will be defined with respect to the printer 1 viewed from the front side. In each drawing, reference codes U, Lo, L, R, Fr, and Rr indicate the upper, lower, left, right, front, and rear sides, respectively. Such upper, lower, left, right, front, and rear sides referred to in the subsequent description are merely for indicating the relation among the components in the corresponding drawing, and not intended to limit the position and orientation of the components provided in the printer 1, to the indicated directions.

The printer 1 includes a main body housing 3, having a rectangular cuboid shape. In the lower portion inside the main body housing 3, sheet cassettes 4 in which sheets S are stored, and sheet feeding rollers 5 for delivering the sheet S to the right, from the respective sheet cassettes 4, are provided. An image forming device 6 that forms a toner image through an electrophotographic process is provided on the upper side of the sheet cassettes 4, and a fixing device 7 for fixing the toner image onto the sheet S is provided on the right upper side of the image forming device 6 in FIG. 1. On the upper side of the fixing device 7, a delivery roller 8 for delivering the sheet S having the toner image fixed thereon, and an output tray 9 for receiving the delivered sheet S, are provided.

Inside the main body housing 3, a transport route 10 is provided, extending from the sheet feeding roller 5 to the delivery roller 8, via the image forming device 6 and the fixing device 7. The transport route 10 is mainly formed of plate-shaped members opposed to each other, with a gap therebetween for allowing the sheet S to pass, and a plurality of transport roller pairs 17, that each serve to transport the sheet S pinched therebetween, are provided at appropriate positions along a transport direction Y. A resist roller 18 is also provided on the transport route 10, at a position upstream of the image forming device 6, in the transport direction Y. On the right side of the fixing device 7, a reversing transport route 10R is provided, which is branched from the transport route 10 at a position downstream of the fixing device 7 in the transport direction Y, and again merges with the transport route 10 at a position upstream of the resist roller 18 in the transport direction Y.

The image forming device 6 includes photoconductor drums 11, the potential of which varies with irradiation of light, charging devices 12 for electrically charging the respective photoconductor drums 11, exposure devices 13 that each output a laser beam based on image data, developing devices 14 that supply the toner to the respective photoconductor drums 11, an intermediate transfer device 15 for transferring the toner image from the photoconductor drum 11 to the sheet S, cleaning devices 16 that remove residual tonner from the respective photoconductor drums 11.

The intermediate transfer device 15 includes an endless intermediate transfer belt 15B stretched around a drive roller 15D and a follower roller 15N, primary transfer rollers 151 opposed to the inner circumferential surface of the intermediate transfer belt 15B, at the position corresponding to the respective photoconductor drums 11, and configured to generate a primary transfer bias, and a secondary transfer roller 152 opposed to the outer circumferential surface of the intermediate transfer belt 15B at the position corresponding to the drive roller 15D, and configured to generate a secondary transfer bias. To each of the developing devices 14, a toner container 20 that supplies the toner thereto is connected.

The image forming device 6 includes four sets of the photoconductor drum 11, the charging device 12, the exposure device 13, the developing device 14, the primary transfer roller 151, the cleaning device 16, and the toner container 20, to form a color image by superposing the toner image of four colors on the intermediate transfer belt 15B. Here, the disclosure is also applicable to an image forming apparatus configured to form the color image with the toner of three or fewer colors, or five or more colors.

The printer 1 also includes a controller 2, having an arithmetic device and a storage device. The arithmetic device may be, for example, a central processing unit (CPU). The storage device may include a storage medium such as a read-only memory (ROM), a random-access memory (RAM), and an electrically erasable programmable read-only memory (EEPROM). The arithmetic device executes various types of operations, by retrieving and executing control programs stored in the storage device. Here, the controller 2 may be realized with an integrated circuit alone, without employing software.

In principle, the printer 1 executes the image forming operation as follows. When a print job by simplex printing is inputted to the printer 1, for example from an external computer, the sheet feeding roller 5 delivers the sheet S from the sheet cassette 4 to the transport route 10, and the resist roller 18 delivers the sheet S, after once stopping rotating to correct the skew of the sheet S, to the image forming device 6 at a predetermined timing. In the image forming device 6, the charging device 12 charges the photoconductor drum 11 to a predetermined potential, the exposure device 13 writes a latent image on the photoconductor drum 11, and the developing device 14 develops the latent image with the toner supplied from the toner container 20, thereby forming the toner image. Then the primary transfer roller 151 transfers the toner image onto the intermediate transfer belt 15B, and the secondary transfer roller 152 transfers the toner image to the sheet S. Thereafter, the fixing device 7 fixes the toner image onto the sheet S, by fusing the toner image while pinching and transporting the sheet S, and the delivery roller 8 delivers the sheet S to the output tray 9. The cleaning device 16 removes the residual toner from the photoconductor drum 11. In the case of duplex printing, the sheet S having the toner image fixed to the first face is made to pass through the reversing transport route 10R and again delivered to the transport route 10, so that another toner image is transferred to the second face of the sheet S.

Toner Container

Figure 2:
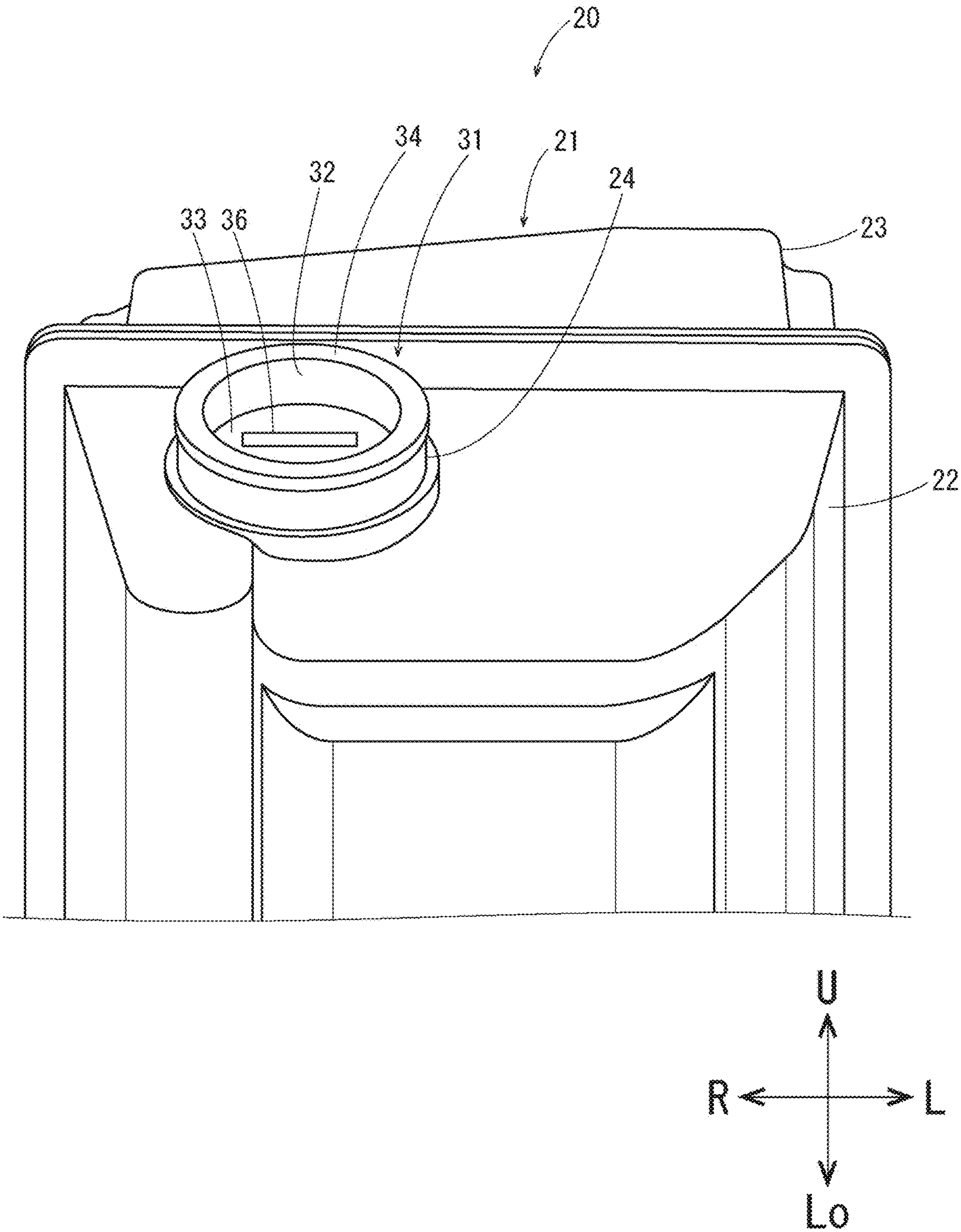
FIG. 2 is a perspective view showing a portion on the side of a loading port, of a toner container according to the embodiment of the disclosure.
Figure 3:
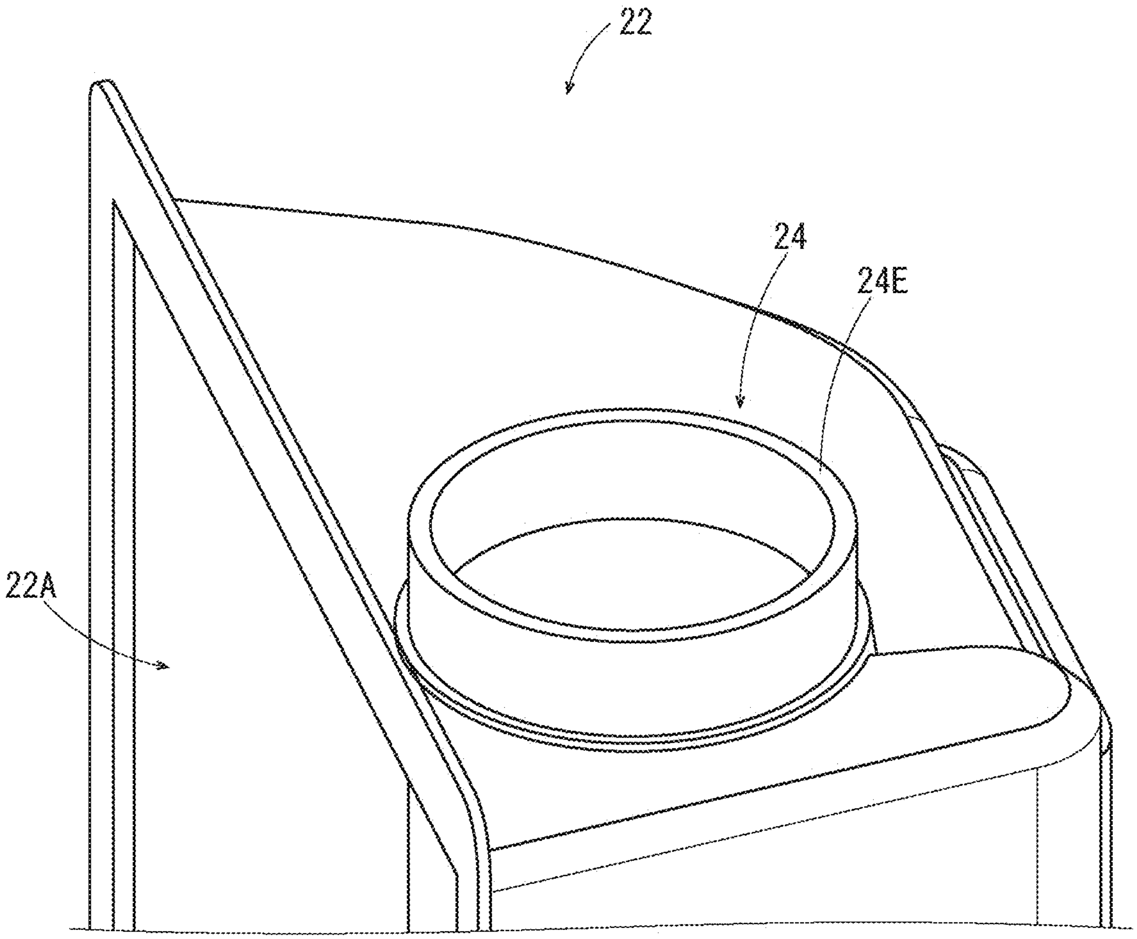
FIG. 3 is a perspective view showing a portion on the side of the loading port, of a main body according to the embodiment of the disclosure.
Figure 4:
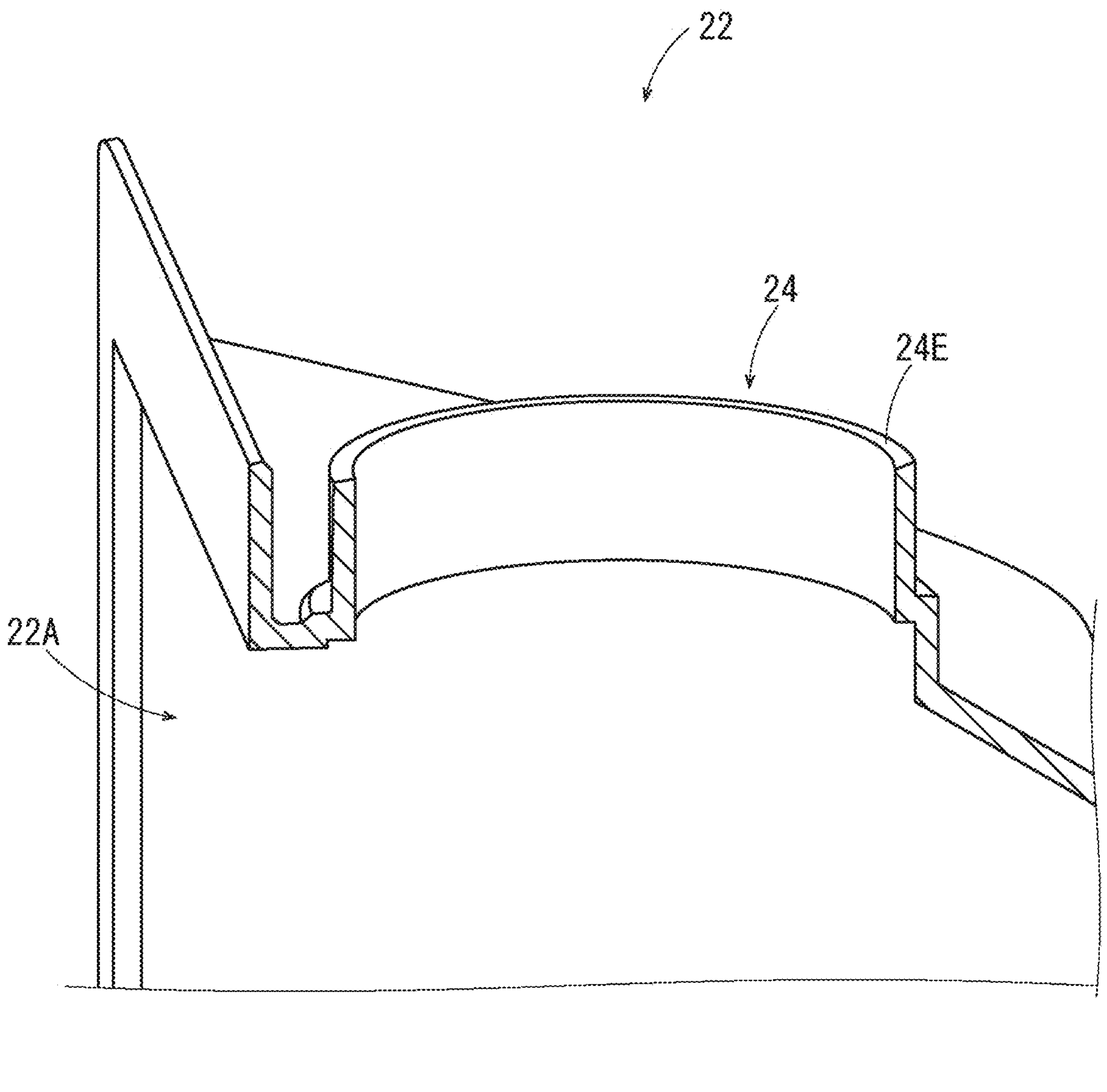
FIG. 4 is a partially cut away perspective view showing a portion on the side of the loading port, of the main body according to the embodiment of the disclosure.
Figure 5:
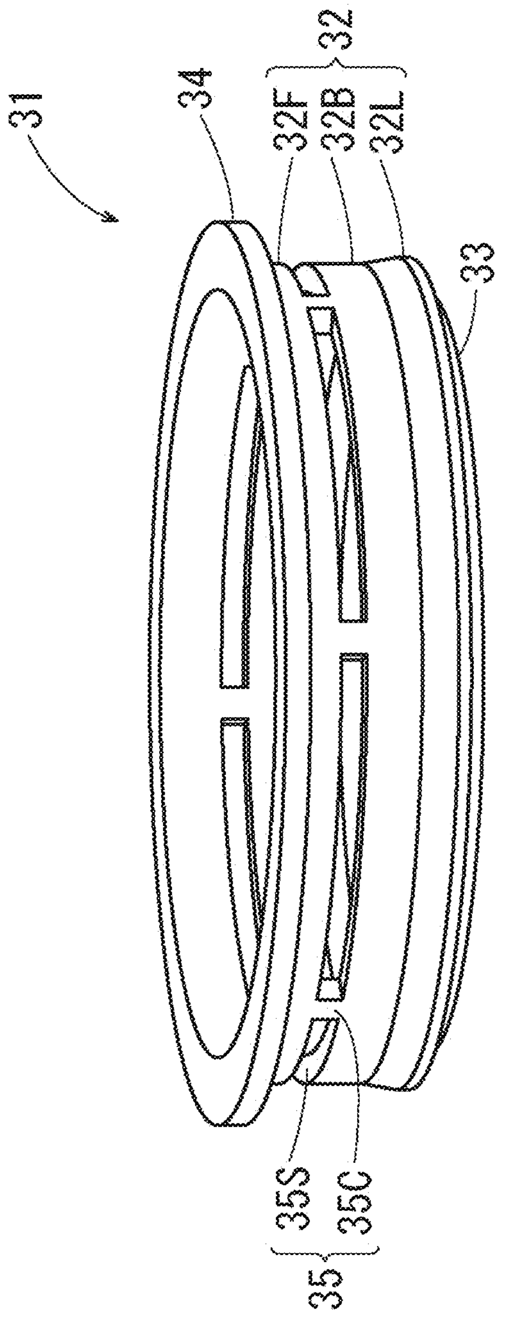
FIG. 5 is a perspective view showing a cap according to the embodiment of the disclosure.
Figure 6:
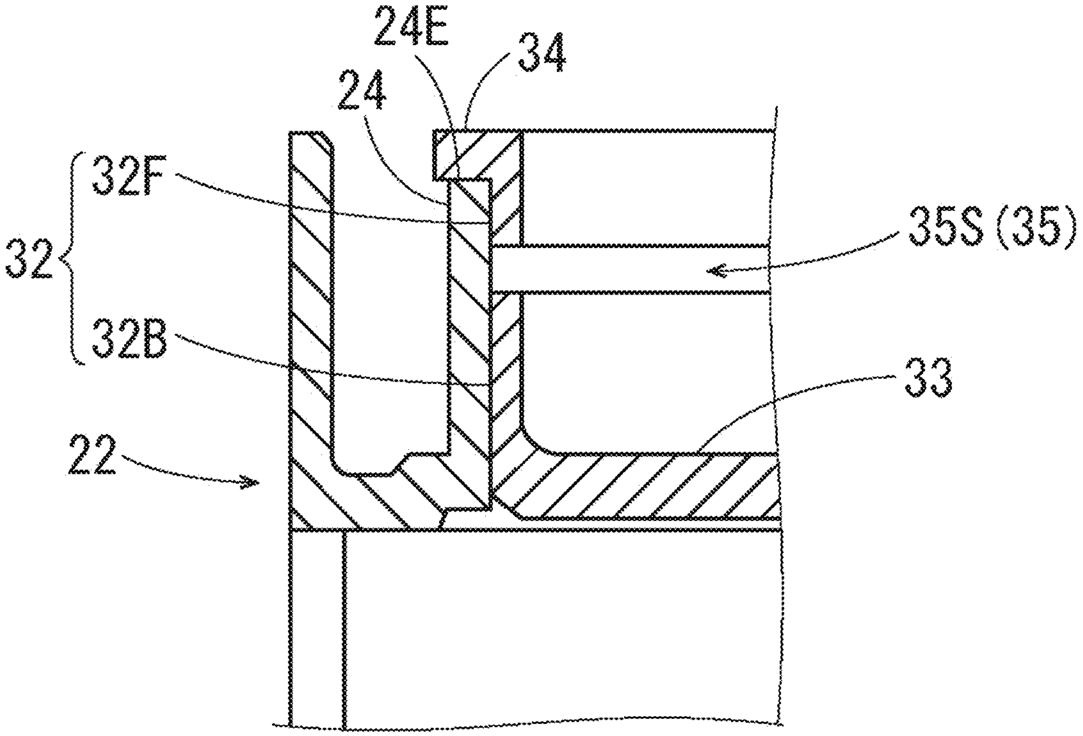
FIG. 6 is a cross-sectional view showing the cap and the loading port, according to the embodiment of the disclosure.
Figure 7:
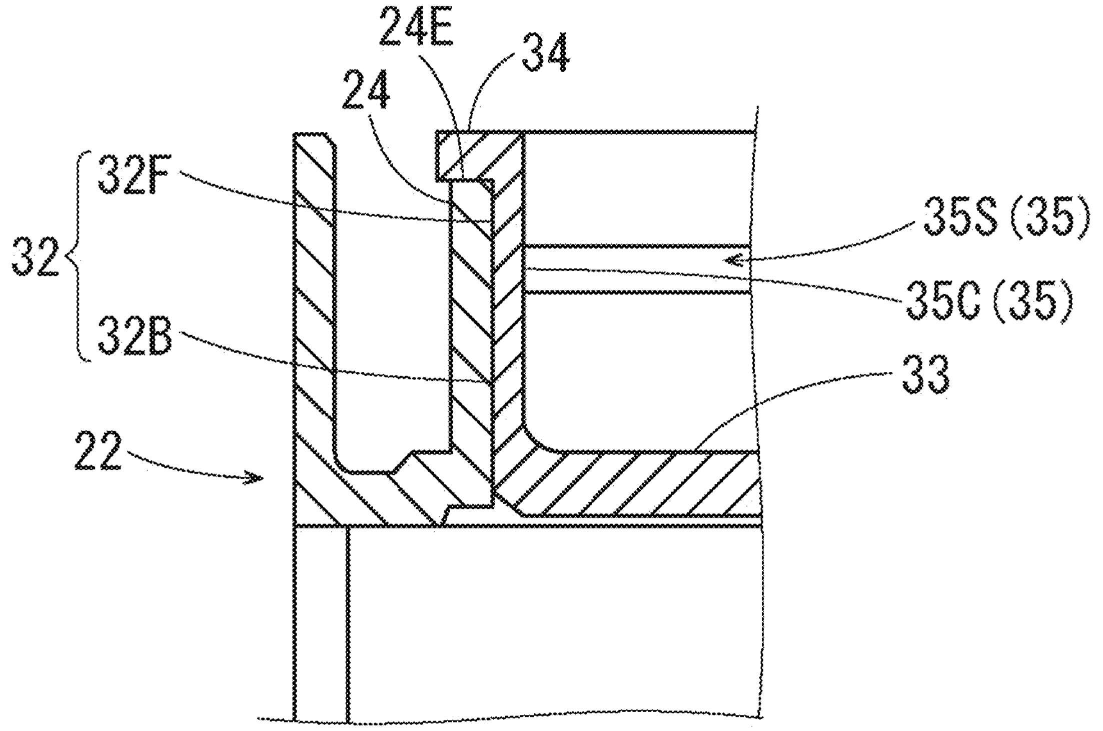
FIG. 7 is another cross-sectional view showing the cap and the loading port, according to the embodiment of the disclosure.

FIG. 2 is a perspective view showing a portion on the side of the loading port 24, of the toner container 20. FIG. 3 is a perspective view showing a portion on the side of the loading port 24, of the main body 22. FIG. 4 is a partially cut away perspective view showing the portion on the side of the loading port 24, of the main body 22. FIG. 5 is a perspective view showing a cap 31. FIG. 6 and FIG. 7 are cross-sectional views each showing the cap 31 and the loading port 24. FIG. 6 illustrates the cross-section where the joint portion 35C is not located, and FIG. 7 illustrates the cross-section where the joint portion 35C is located. The toner container 20 includes a tank 21, having a cylindrical loading port 24 through which the toner is to be loaded, and the cap 31 formed of a flexible material and configured to close the loading port 24.

Tank

The tank 21 (see FIG. 2) is formed in an elongate shape in the front-rear direction of the printer 1. The tank 21 includes a main body 22 of a concave shape with an opening 22A, and a lid 23 that closes the opening 22A. The lid 23 is bonded to the main body 22. The loading port 24 (see FIGS. 2, 3, 4, 6, and 7) is located at an end portion of the main body 22 in the longitudinal direction, more specifically the rear end portion to be located on the rear side of the printer 1, when the toner container 20 is mounted therein. The loading port 24 is formed in a circular cylindrical shape, protruding from the rear end portion of the main body 22. On the other end portion of the main body 22 in the longitudinal direction, namely the front end portion to be located on the forward side of the printer 1, when the toner container 20 is mounted therein, a non-illustrated supply port is provided. The toner is supplied to the developing device 14 from the supply port, through a non-illustrated piping.

Cap

The loading port 24 is closed by the cap 31 (see FIGS. 2, 5, 6, and 7). The cap 31 is formed of a flexible resin, such as low-density polyethylene (LDPE) or silicone rubber. The cap 31 includes a cylindrical fitting portion 32 to be fitted to the inner surface of the loading port 24, a bottom portion 33 located on the far side of the fitting portion 32 in the insertion direction of the cap 31, and a flange portion 34 located on the near side of the fitting portion 32 in the insertion direction of the cap 31, and to be made to contact the edge 24E of the loading port 24. The fitting portion 32 includes a cut-away portion 35, formed in an annular shape at predetermined positions along the circumferential direction of the fitting portion 32.

The fitting portion 32 (see FIGS. 5, 6, and 7) is formed in a circular cylindrical shape. The cut-away portion 35 includes slits 35S each extending in the circumferential direction of the fitting portion 32, and respectively formed at a plurality of positions (in this embodiment, six positions) along the circumferential direction. Between the slits 35S adjacent to each other, a joint portion 35C (see FIGS. 5 and 7) is located. The portion of the fitting portion 32 on the side of the bottom portion 33, with respect to the cut-away portion 35, will be referred to as bottom-side fitting portion 32B. The portion of the fitting portion 32 on the side of the flange portion 34, with respect to the cut-away portion 35, will be referred to as flange-side fitting portion 32F. The bottom-side fitting portion 32B and the flange-side fitting portion 32F are connected to each other via the joint portion 35C.

The wall thickness of the joint portion 35C, taken in the radial direction of the fitting portion 32, is equal to the average wall thickness of the portion of the fitting portion 32 other than the cut-away portion 35 and the joint portion 35C, namely the bottom-side fitting portion 32B, and the flange-side fitting portion 32F. In this embodiment, for example, the wall thickness of the bottom-side fitting portion 32B is equal to that of the flange-side fitting portion 32F, and the wall thickness of the joint portion 35C is equal to that of the bottom-side fitting portion 32B and the flange-side fitting portion 32F. The six joint portions 35C have the same width in the circumferential direction. The six joint portions 35C are located at regular intervals along the circumferential direction. Therefore, the six slits 35S have the same length, in the circumferential direction.

The bottom-side fitting portion 32B includes a cylindrical expanded portion 32L (see FIG. 5, not shown in FIGS. 6 and 7), the outer circumferential surface of which has an increased diameter. The expanded portion 32L is formed so as to smoothly swell from the bottom-side fitting portion 32B. In this example, the expanded portion 32L is formed at the lowermost position of the bottom-side fitting portion 32B. Although the position of the expanded portion 32L on the bottom-side fitting portion 32B is not specifically limited, it is preferable to form the expanded portion 32L at a position on the fitting portion 32 on the side of the bottom portion 33, with respect to the cut-away portion 35. When the cap 31 is attached to the loading port 24, the expanded portion 32L is fitted to the inner surface of the loading port 24 in close contact therewith, with a higher pressure than the remaining portions of the fitting portion 32.

On the upper face of the bottom portion 33 (face exposed to outside when the cap 31 is attached to the tank 21), an authentication label 36 (see FIG. 2) is stuck. For example, the name of the manufacturer of the toner container 20 is marked on the authentication label 36. Accordingly, the authentication label 36 enables the user to identify whether the cap 31 is provided by the legitimate manufacturer.

When the remaining amount of the toner in toner container 20 mounted in the printer 1 becomes below a prespecified amount, the toner container 20 is replaced. The used toner container 20 is collected by the manufacturer or a specialized contractor, to be recycled.

In the recycling operation of the toner container 20, first the cap 31 is removed from the tank 21. Because of the presence of the cut-away portion 35 at the predetermined positions along the circumferential direction of the fitting portion 32, it is only the joint portions 35C that exist along the circumferential direction, between the cut-away portions 35 adjacent to each other. Accordingly, when the service person draws out the cap 31 by grabbing the flange portion 34, the cap 31 is torn apart along the boundary defined by the cut-away portion 35. This makes the cap 31 no longer usable. A cap that is not torn apart upon being removed can be identified as the one different from the cap 31, and therefore an illegitimate product provided with such different cap can be easily distinguished.

Although the cap 31 is torn apart by being removed, the expanded portion 32L formed on the bottom-side fitting portion 32B is in close contact with the inner wall of the loading port 24, and therefore the portion on the side of the bottom portion 33 is prevented from falling off into the tank 21. Thus, the portion of the cap 31 on the side of the bottom portion 33 (portion including the bottom-side fitting portion 32B and the bottom portion 33) remains in the loading port 24, thereby preventing broken fragments of the cap 31 from falling into the tank 21. The portion on the side of the bottom portion 33 can be easily removed, for example by picking up the bottom-side fitting portion 32B with the fingers.

In addition, since there is no need to cut off a part of the tank 21 in order to remove the cap 31, the tank 21 can be reused, over an unlimited number of times of recycling. Further, employing the cap 31 of the same specification as the originally provided cap 31, at the time of recycling, leads to reduction in manufacturing cost of the cap 31.

After the toner is replenished through the loading port 24, a new cap 31 is attached. The cap 31 can be easily attached, simply by squeezing the cap 31 into the loading port 24.

The toner container 20 according to this embodiment described as above includes the tank 21 including a cylindrical loading port 24, through which the toner is to be loaded, and the cap 31 formed of a flexible material, and configured to close the loading port 24. The cap 31 includes the fitting portion 32 formed in the cylindrical shape that fits the inner surface of the loading port 24, the bottom portion 33 located on the far side of the fitting portion 32, in the insertion direction of the cap 31, and the flange portion 34 located on the near side of the fitting portion 32 in the insertion direction of the cap 31, to be made to contact the edge of the loading port 24. The fitting portion 32 includes the cut-away portion 35 formed in the annular shape along the circumferential direction of the fitting portion 32. The mentioned configuration enables the cap 31 to be removed without damaging the tank 21, and disables the cap 31 from being reused.

In the toner container 20 according to this embodiment, the cut-away portion 35 includes the slits 35S each extending in the circumferential direction, and respectively located at the plurality of positions along the circumferential direction. Such a configuration enables the cap 31 to be easily torn apart, because the stress is concentrated at the joint portions 35C formed between the slits 35S adjacent to each other.

In the case of existing toner containers, unlike the foregoing embodiment, a part of the tank is cut away together with the cap, when the cap is to be removed from the tank. In this case, the fragments of the tank may fall into the inside of the tank. In addition, the cylindrical body to which the cap is attached becomes shorter, each time the cap is removed, and therefore the number of times that the tank and the cylindrical body can be recycled, is limited. Further, another cap that can be attached to the tank, a part of which has been cut away, in other words a cap of a different shape from the originally provided one, is employed at the time of recycling. Therefore, the manufacturing cost of the cap is inevitably increased.

The configuration according to the foregoing embodiment enables the cap 31 to be removed without damaging the tank 21, and disables the cap 31 from being reused, thereby facilitating the user to identify whether the toner container is the legitimate product.

The foregoing embodiment may be modified as follows.

First Variation

Figure 8:
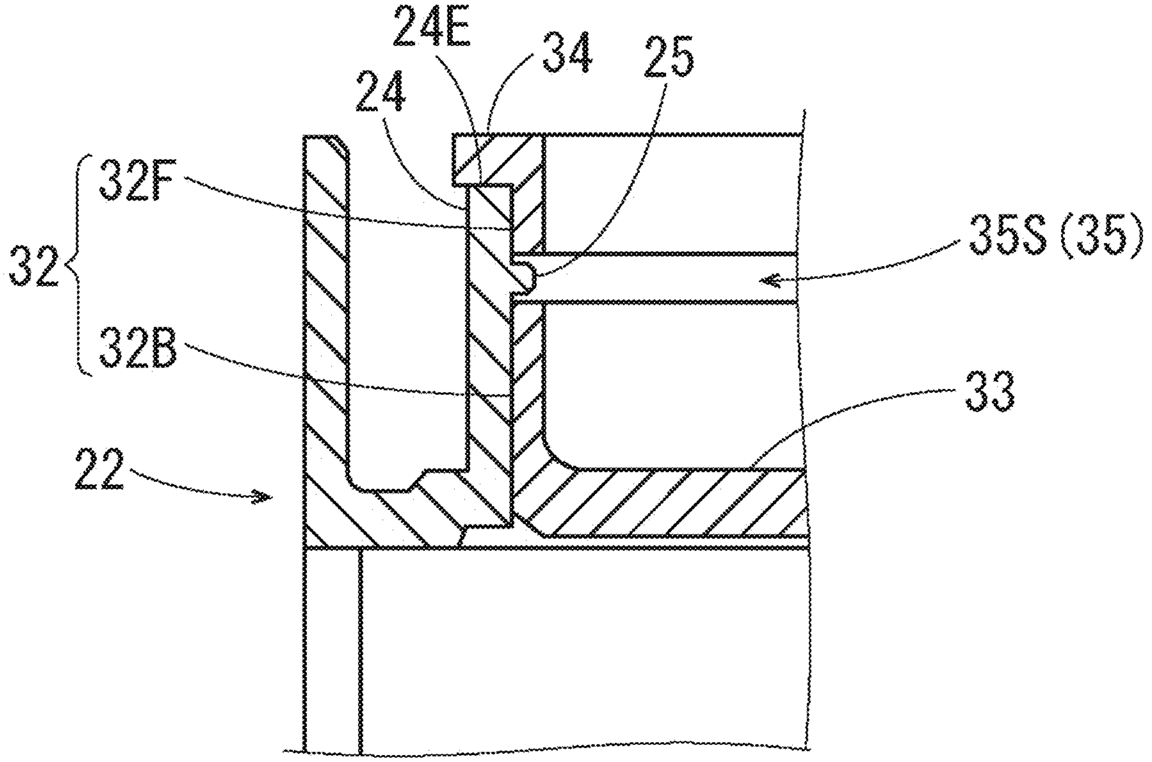
FIG. 8 is a cross-sectional view showing a cap and a loading port, according to a first variation of the embodiment of the disclosure.

FIG. 8 is a cross-sectional view showing the cap 31 and the loading port 24, according to a first variation. FIG. 8 illustrates the cross-section of the position where the joint portion 35C is not located. The toner container 20 according to this variation includes a protrusion 25 protruding from the inner surface of the loading port 24, so as to be fitted in the slit 35S. In this case, the cap 31 can be securely fixed to the tank 21.

Second Variation

Figure 9:
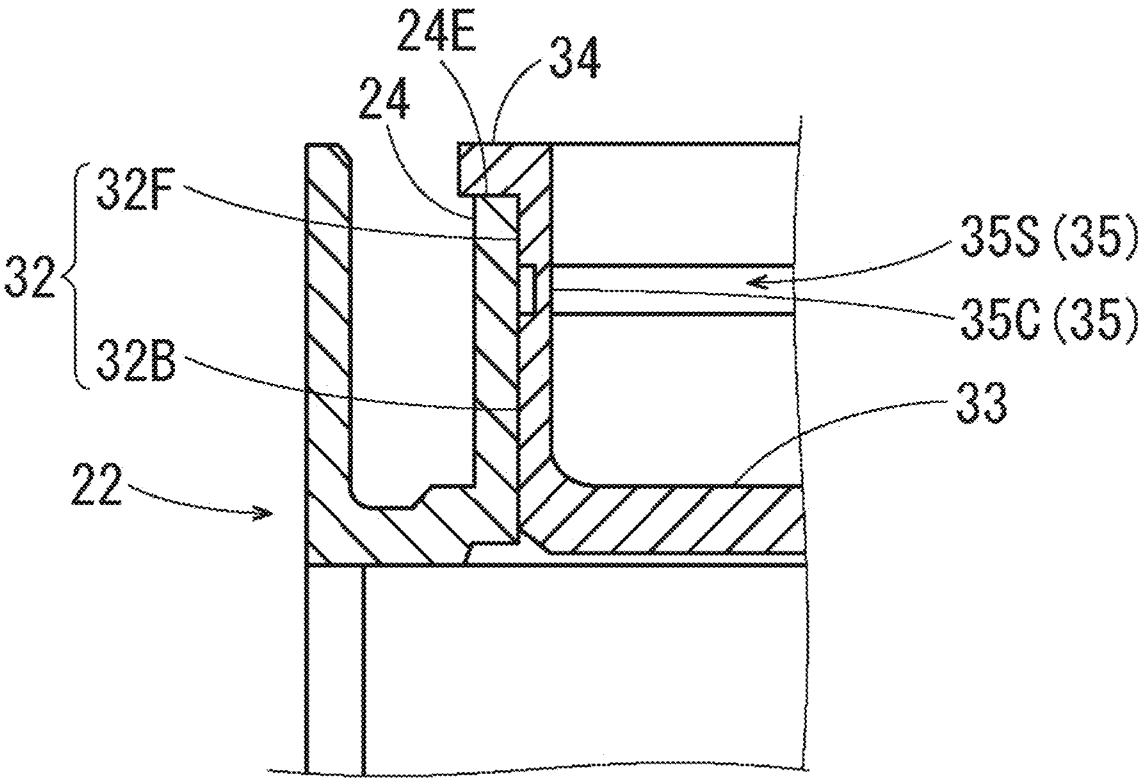
FIG. 9 is a cross-sectional view showing a cap and a loading port, according to a second variation of the embodiment of the disclosure.

FIG. 9 is a cross-sectional view showing the cap 31 and the loading port 24, according to a second variation. FIG. 9 illustrates the cross-section of the position where the joint portion 35C is located. In the toner container 20 according to this variation, the wall thickness of the joint portion 35C, located between the slits 35S adjacent to each other is thinner than the average wall thickness of the portions of the fitting portion 32 other than the joint portion 35C and the cut-away portion 35, namely the bottom-side fitting portion 32B and the flange-side fitting portion 32F. In this variation, for example, the wall thickness of the bottom-side fitting portion 32B is equal to that of the flange-side fitting portion 32F, and the wall thickness of the joint portion 35C is thinner than that of the bottom-side fitting portion 32B and the flange-side fitting portion 32F. Such a configuration further facilitates the stress to be concentrated at the joint portion 35C, compared with the case of the foregoing embodiment, thereby making it easier to tear the cap 31 apart.

Third Variation

Figure 10:
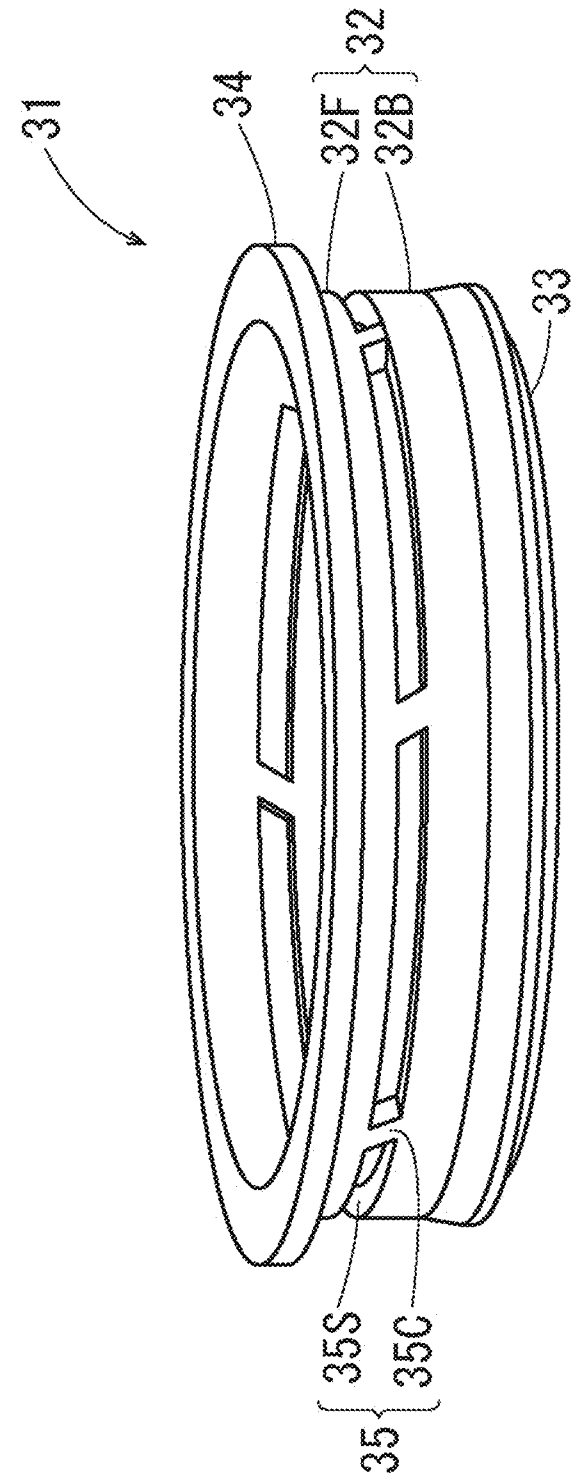
FIG. 10 is a perspective view showing a cap according to a third variation of the embodiment of the disclosure.

FIG. 10 is a perspective view showing the cap 31 according to a third variation. In the toner container 20 according to this variation, the joint portion 35C located between the slits 35S adjacent to each other is inclined, with respect to the insertion direction of the cap 31. In the case where the joint portion 35C is formed parallel to the insertion direction of the cap 31, the joint portion 35C is subjected to a shearing force and may be torn, if the cap 31 is squeezed into the loading port 24 with a rotating motion. According to this variation, in contrast, the shearing force imposed on the joint portion 35C can be alleviated, by rotating the cap 31 in the direction to apply a compression load to the joint portion 35C (counterclockwise in FIG. 10), and therefore the joint portion 35C can be prevented from being torn apart. In addition, rotating the cap 31 in the mentioned direction facilitates the force to be more effectively exerted to the cap 31, thus making it easier to attach the cap 31. In this case, it is preferable to indicate the rotation direction for attaching the cap 31, in the proximity of the bottom portion 33 of the cap 31, or the loading port 24 of the tank 21. For example, a label indicating a predetermined rotation direction of the cap 31, for attaching to the loading port 24, may be provided at a predetermined position in the proximity of the bottom portion 33 of the cap 31, or the loading port 24 of the tank 21.

While the present disclosure has been described in detail with reference to the embodiments thereof, it would be apparent to those skilled in the art that the various changes and modifications may be made therein within the scope defined by the appended claims.

What is claimed is:

1. A toner container comprising:

a tank including a cylindrical loading port, through which toner is to be loaded; and a cap formed of a flexible material, and configured to close the loading port, wherein the cap includes:

a fitting portion formed in a cylindrical shape that fits an inner surface of the loading port;

a bottom portion located on a far side of the fitting portion, in a cap insertion direction; and a flange portion located on a near side of the fitting portion in the cap insertion direction, to be made to contact an edge of the loading port, and the fitting portion is formed with a cut-away portion formed in an annular shape along a circumferential direction of the fitting portion.

2. The toner container according to claim 1, wherein the fitting portion includes a cylindrical expanded portion, larger in diameter than the fitting portion, and formed at a position on a side of the bottom portion with respect to the cut-away portion.

3. The toner container according to claim 1, wherein the cut-away portion includes slits each extending in the circumferential direction, and respectively formed at a plurality of positions along the circumferential direction.

4. The toner container according to claim 3, further comprising a protrusion protruding from the inner surface of the loading port, to be engaged with the slit.

5. The toner container according to claim 3, wherein a wall thickness of a joint portion provided between the slits adjacent to each other is thinner than an average wall thickness of a portion of the fitting portion other than the cut-away portion and the joint portion.

6. The toner container according to claim 3, wherein a joint portion provided between the slits adjacent to each other is inclined with respect to the cap insertion direction.

7. The toner container according to claim 6, wherein a predetermined rotation direction, for rotating the cap when attaching the cap to the loading port, is indicated at a predetermined position in a proximity of the bottom portion of the cap, or the loading port of the tank.

* * * * *